(12) United States Patent
Barton et al.

(10) Patent No.: US 12,234,166 B2
(45) Date of Patent: Feb. 25, 2025

(54) DISPENSING CARTRIDGE ALERT

(71) Applicant: King Technology Inc., Hopkins, MN (US)

(72) Inventors: Eric Barton, Eden Prairie, MN (US); Jeffrey D. Johnson, Edina, MN (US); Darrin M Swagel, Minnetonka, MN (US)

(73) Assignee: King Technology, Inc., Minnetonka, MN (US)

( * ) Notice: Subject to any disclaimer, the term of this patent is extended or adjusted under 35 U.S.C. 154(b) by 307 days.

(21) Appl. No.: 17/941,495

(22) Filed: Sep. 9, 2022

(65) Prior Publication Data
US 2023/0357060 A1 Nov. 9, 2023

Related U.S. Application Data

(60) Provisional application No. 63/360,215, filed on Sep. 14, 2021.

(51) Int. Cl.
C02F 1/68 (2023.01)

(52) U.S. Cl.
CPC ............... *C02F 1/68* (2013.01); *C02F 1/685* (2013.01); *C02F 2201/006* (2013.01); *C02F 2209/445* (2013.01)

(58) Field of Classification Search
CPC .. C02F 1/68; C02F 1/681; C02F 1/682; C02F 1/683; C02F 1/685; C02F 1/686; C02F 1/687; C02F 1/688; C02F 2201/006; C02F 2209/445; C02F 2307/10; C02F 1/003
USPC ......................................................... 116/317
See application file for complete search history.

(56) References Cited

U.S. PATENT DOCUMENTS

| | | |
|---|---|---|
| 11,008,770 B1 | 5/2021 | Brennan |
| 2014/0175022 A1 | 6/2014 | King |
| 2015/0068947 A1 | 3/2015 | Balakier et al. |
| 2017/0267439 A1 | 9/2017 | Snetting et al. |

*Primary Examiner* — Terry K Cecil
(74) *Attorney, Agent, or Firm* — Fredrikson & Byron, P.A.

(57) ABSTRACT

A cartridge dispenser having a rotatable sleeve for alerting a person as to when a cartridge dispenser should be replaced based on when the cartridge dispenser is placed in a body of water with the cartridge replacement date carried forward on the cartridge dispenser.

21 Claims, 3 Drawing Sheets

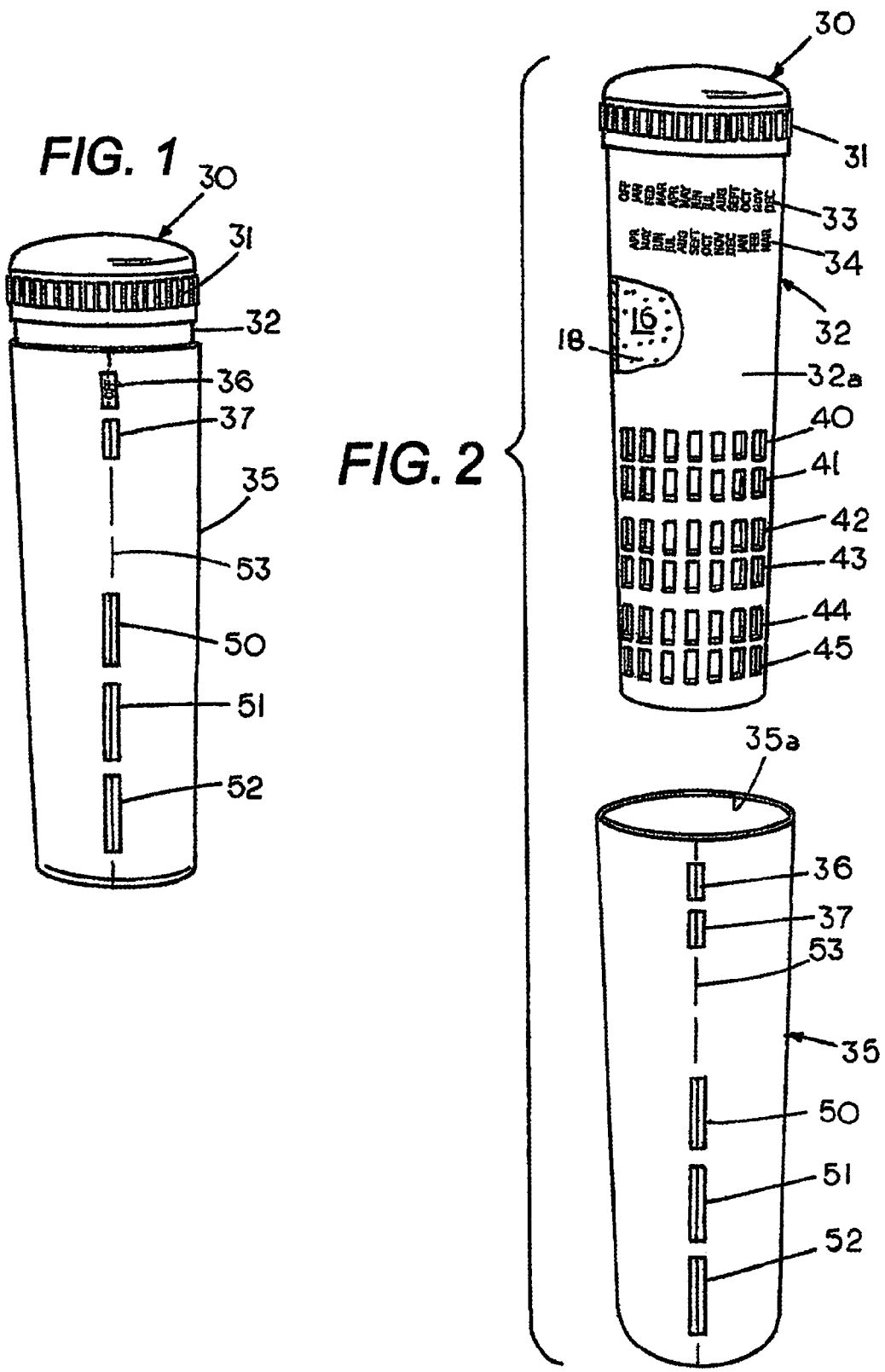

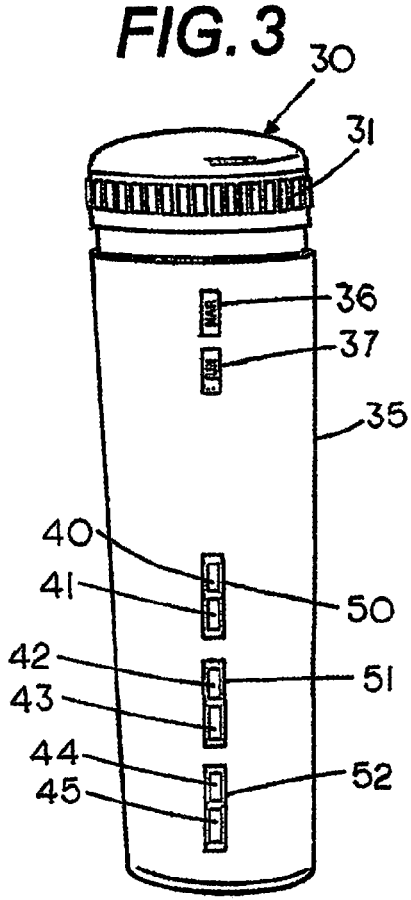
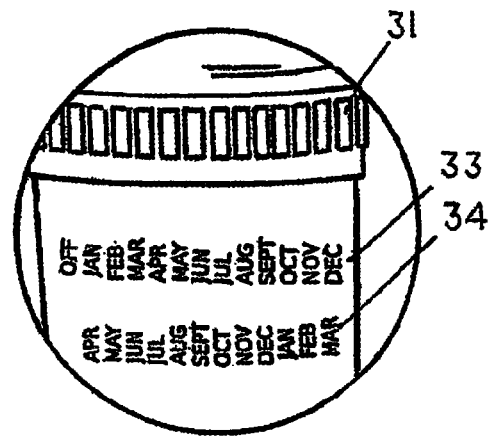
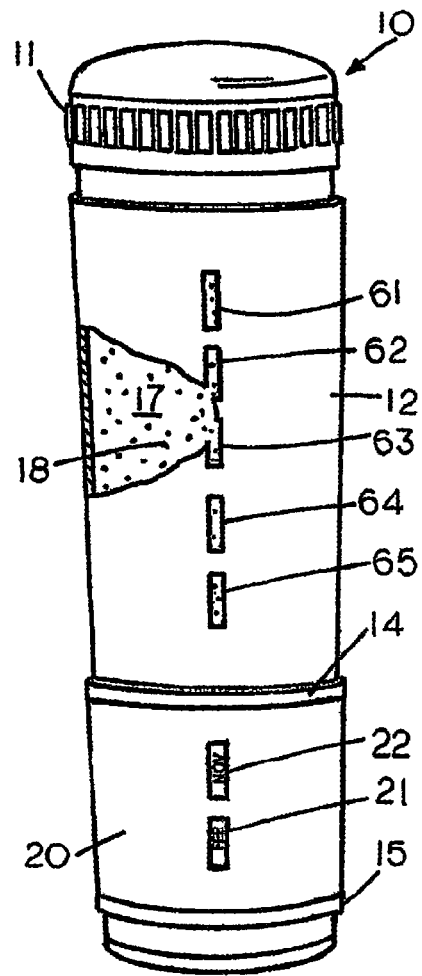

DISPENSING CARTRIDGE ALERT

CROSS REFERENCE TO RELATED APPLICATIONS

This application claims priority from provisional application 63/360,215 filed Sep. 14, 2021.

STATEMENT REGARDING FEDERALLY SPONSORED RESEARCH OR DEVELOPMENT

None

REFERENCE TO A MICROFICHE APPENDIX

None

BACKGROUND OF THE INVENTION

Cartridge dispensers to deliver a dispersant to a body of recreational water are known in the art. Typical of such cartridge dispensers are those shown in King U.S. Pat. Nos. 8,617,481 and 7,059,540. Known cartridge dispensers include an inner housing containing a set of diffusion ports and an outer rotatable sleeve that can be rotated to either reduce or increase the size of the water ports and therefore increase or decrease the rate of a dispersant delivered to the body of recreational water. Another type of dispenser has fixed openings that do not allow for changing the port size in the cartridge dispenser.

SUMMARY OF THE INVENTION

A cartridge dispenser containing a dispersant therein with the dispersant having a predetermined water life. The dispersant, which is located in an inner compartment of the cartridge dispenser, is exposed to a body of recreational water though rotation of an outer housing that opens a set of water ports, which initiates water access to the dispersant of predetermined water life within the cartridge dispenser. An inner housing contains a first circumferential date band and a second circumferential date band that are normally concealed by an outer housing when the cartridge dispenser is in a storage position. To bring the cartridge dispenser into an operating position, one rotates the outer housing to open water ports in the cartridge dispenser and aligns a viewing port on the outer housing with the date the cartridge dispenser is placed into a body of water, which simultaneously aligns a second viewing port with the date the cartridge dispenser should be replaced. The cartridge dispenser can then be placed in a body of water with the cartridge dispenser carrying its own replacement date, which is readily viewable to anyone who needs to check if the cartridge dispenser should be replaced.

BRIEF DESCRIPTION OF THE DRAWINGS

FIG. 1 is a front view of a cartridge dispenser in a storage condition;

FIG. 2 is an exploded view of the cartridge dispenser of FIG. 1;

FIG. 3 is a front view of the cartridge dispenser of FIG. 1 in a dispensing or operating condition.

FIG. 3A is an enlarged view of the circumferential date bands on the inner housing of the cartridge dispenser of FIG. 1;

FIG. 4 is a front view partially in section of an alternate embodiment of a dispenser cartridge with a rotatable sleeve.

DESCRIPTION OF THE PREFERRED EMBODIMENT

Figure 5:
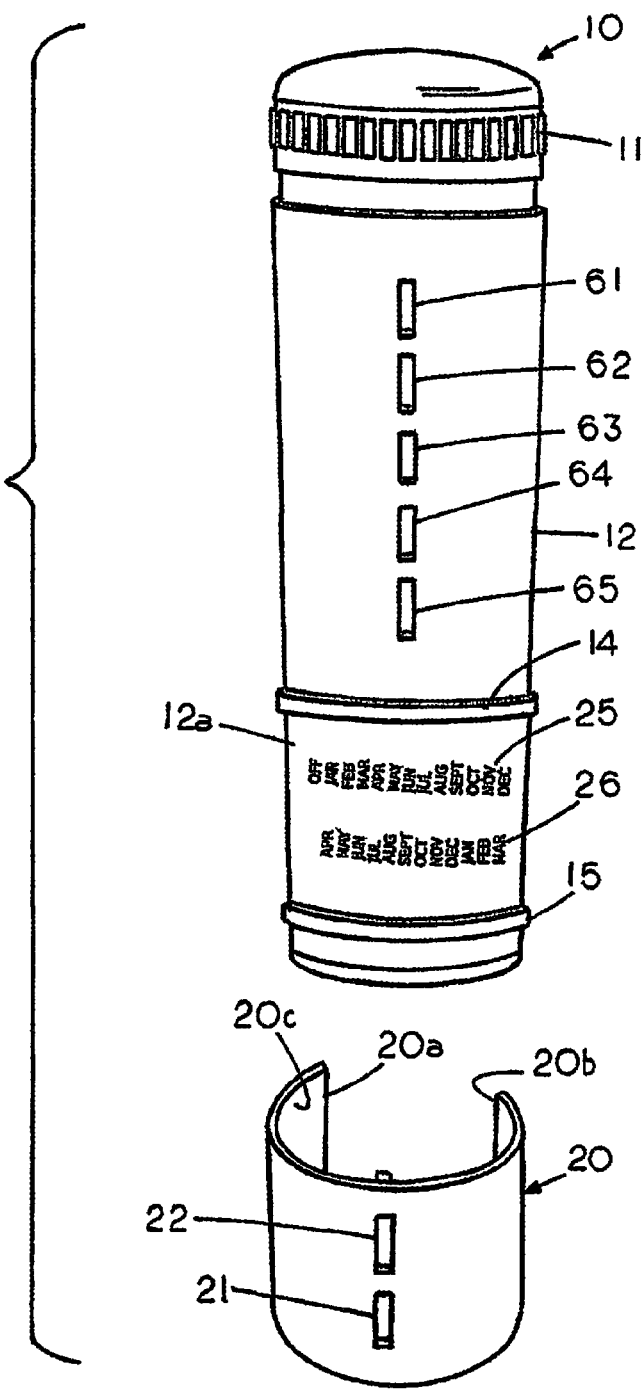
FIG. 5 is an exploded view of the cartridge dispenser of FIG. 4.

FIG. 1 is a front view of a cartridge dispenser 30 in a storage condition or closed condition. Cartridge dispenser 30 includes an outer housing 35 with a set of elongated water ports 50, 51 and 52 and a set of elongated viewing ports 36 and 37 located along an element 53 of outer housing 35 and an inner elongated container 32 having a cap 31. Outer housing 35 is rotatable with respect to inner elongated container 32, preferably through a mating frictional engagement therebetween that allows hand rotation of outer housing 35 with respect to container 32 but prevents free rotation therebetween. In this example, outer housing 35 comprises a rotatable date selector or date indicator that manually determines the date when a cartridge dispenser should be replaced by exposing a cartridge replacement date in second viewing port 37 when a cartridge dispenser water placement date is visible in first viewing port 36. The water life of dispersant 18 is determined by the type of dispersant in the inner elongated container 32. For example, in the closed or storage condition, as shown in FIG. 1, the term OFF is visible in first viewing port 36 while no dates are visible in second viewing port 37 and water ports 50, 51 and 52 are in a closed condition that prevents water access to dispersant 18.

FIG. 2 is an exploded view of the cartridge dispenser 30 of FIG. 1 showing outer housing 35 which is a closed end sleeve that has an inner sidewall 35a that mateingly and frictionally fits around an exterior surface 32a of inner container 32 to prevent leakage therebetween. A cutaway view in FIG. 2 reveals a dispersant compartment 16 with a dispersant 18 located within compartment 16. In this example, the dispersant 18 in compartment 16 has a predetermined water dispensing life, as opposed to a dispersant such as chlorine, whose water dispensing life is based on the rate chlorine is consumed in removing unwanted bacteria in a body of water. An example of a commercially available water dispersant with a predetermined water dispensing life are minerals containing silver chloride, which typically have a predetermined water dispensing life of six months before the minerals need to be replaced.

Located on an exterior surface on a top end of housing 32 is a first circumferential date band 33 that extends partially around housing 32 with the first circumferential date band 33 carrying the word "OFF" and a first set of dates, which in this example are the twelve months January through December. Located below date band 33 is a second circumferential date band 34 that extends partially around housing 32. Date band 34, which is also located on the exterior surface of the housing 32, carries a second set of dates, which in this example are also the twelve months January through December. Each of the date bands 33 and 34 are located parallel to each other and to the bottom of container 32. In this example, one rotates outer housing 35 to view a first date on band 33 through viewing port 36, which brings a second date from band 34 visible in viewing port 37 as the outer housing 35 is rotated with respect to inner housing 32. In this example the viewing port 36 and the viewing port 37 are in elemental alignment along element line 53 with each other while the date band 33 and the date band 34 are circumferentially offset by six months so a date viewable in viewing port 37 is six months later then the date viewable in viewing port 36. In this case, the six months corresponds to the predetermined water life of the dispersant 18 after the cartridge dispenser 30 is placed in a body of recreational water. For example, if one places cartridge dispenser 30, which has a predetermined water life of 6 months, into the water in June one selects June in viewing port 36 by rotating outer housing 35. Selecting June in viewing port 36 exposes the month December in viewing port 37, which is the month the cartridge should be replaced i.e., the product replacement date. In this example, the cartridge dispenser 30 carries its own unique reminder date as to when the cartridge dispenser should be replaced thereby making it convenient for a person to check as to when the cartridge dispenser should be replaced since the person can view the replacement date exposed in viewing port 37.

In this example outer housing 35 has a storage position or a closed condition (i.e. OFF) where the set of water ports 50, 51 and 52 in outer housing 35 are not in alignment with any of the water ports 40, 41, 42, 43, 44 and 45, which are circumferentially positioned around inner housing 32. The closed or OFF position, shown in FIG. 1, prevents water access to dispersant 18 in dispersant compartment 16 (FIG. 2), which avoids premature water activation of dispersant 18.

Rotatable outer housing 35 also has an operating position where the set of water ports 50, 51 and 52 in outer housing 35 are always in alignment with at least one set of water ports in water port rows 40, 41, 42, 43, 44 and 45 in elongated container 32 since the water port rows extend circumferentially around container 32 to provide water access to the dispersant 18 regardless of the dates viewable in date band 33 and date band 34.

FIG. 3 shows a first date in the first circumferential date band 33, which is viewable in the first viewing port 36, and a second date in the second circumferential date band 34, which is viewable in the second viewing port 37, where the date viewable in the first viewing port 36 is the date cartridge dispenser 30 is placed in a body of water and the date viewable in the second viewing port 37 is the date when the cartridge dispenser 30 should be replaced with a fresh cartridge dispenser.

In the example shown, cartridge dispenser 30 converts from a storage position (FIG. 1) to an operating position (FIG. 3) though rotation of outer housing 35. That is, one rotates outer housing 35 to select a date in viewing port 36, which is the date the cartridge dispenser is placed into use in the body of recreational water i.e., a water immersion date. The selection of a water immersion date from date band 33 in viewing port 36 automatically exposes a cartridge replacement date from date band 34 in viewing port 37.

The date band 33 and date band 34 both contain the months of the year with the months in elemental alignment as shown in FIG. 3A. The difference in months viewable in the viewing ports is the length of time before a cartridge dispenser should be replaced. For example, if viewing port 36 shows May and viewing port 37 shows September the time to replace the cartridge dispenser is four months. Other date bands then months could be used as well as different element alignments of the viewing ports without departing from the spirit and scope of the invention.

FIG. 4 and FIG. 5 show an alternate embodiment of a cartridge dispenser 10 for incorporating a cartridge replacement date directedly onto the cartridge dispenser. In this example, the date band 25 and date band 26 are circumferentially located on a lower end of cartridge dispenser 10 with dates thereon viewable thorough a viewing port 21 and a viewing port 22. Cartridge dispenser 10 a includes a resilient, snap-on date selector 20 or date indicator comprising a split open-ended sleeve having edge 20a and 20b that has an inner surface 20c that mateingly and frictionally engages cartridge dispenser surface 12a at the lower end of housing 12. An upper stop 14, which comprises an annular ring, and a lower stop 15, which also comprises an annular ring, axially maintain the date indicator therebetween. In use, one selects a cartridge water placement start date in viewing port 22 through a circumferential rotation of snap-on date selector 20. Selecting the cartridge water placement date or startup date in viewing port 22 automatically exposes a cartridge replacement date in viewing port 21. In this example, the selection of the cartridge placement date and the cartridge replacement date are independent of the opening and closing of the water ports 61, 62, 63, 64, and 65. That is, water ports 61, 62, 63, 64 and 65 remain in an open condition, although for shipping and handling, a removable adhesive strip may be placed over the water ports to prevent dispersant 18 in compartment 17 from spilling or being prematurely exposed to water during shipping and handling of the cartridge dispenser 10.

We claim:

1. A cartridge dispenser for alerting a person as to when the cartridge dispenser should be replaced comprising:
    a housing having a dispersant chamber therein;
    a set of water ports therein for ingress and egress of water into the dispersant chamber;
    a dispersant located in the dispersant chamber with the dispersant having a predetermined dispensing life start date based on when the cartridge dispenser is placed into a body of recreational water;
    a first circumferential date band located on an exterior surface of the housing with the first circumferential date band carrying a first set of dates;
    a second circumferential date band located on the exterior surface of the housing with the second circumferential date band carrying a second set of dates;
    a rotationally positionable indicator located on the housing;
    a water port in said rotationally positionable indicator;
    a first viewing port in said rotationally positionable indicator, said first viewing port alignable with a first date on the first circumferential date band;
    a second viewing port in said rotationally positionable indicator alignable with a second date on the second circumferential date band; said rotational indicator having a storage position where the set of water ports in the housing are not in alignment with the water port in said rotationally positionable indicator to prevent water access to the dispersant in the dispersant chamber and an operating position where the set of water ports in the housing are alignable with the water port in said rotationally positionable indicator to provide water access to the dispersant in the dispersant chamber: and
    a first date in the first circumferential date band viewable in the first viewing port and a second date in the second circumferential date band viewable in the second viewing port where the date viewable in the first viewing port is the date when the cartridge dispenser is placed into use in a body of recreational water and the date viewable in the second viewing port is the date when the cartridge dispenser should be replaced with said cartridge dispenser going from the storage position to the operating position though rotation of the rotationally positionable indicator to select the date when the cartridge dispenser is placed into use in the body of recreational water.

2. The cartridge dispenser of claim 1 wherein the first set of dates in the first circumferential date band contain the months of the year.

3. The cartridge dispenser of claim 2 where the second set of dates in the second circumferential date band contains the months of the year.

4. The cartridge dispenser of claim 1 wherein the date viewable in the second viewing port is three months after the cartridge dispenser is placed into use in the body of recreational water.

5. The cartridge dispenser of claim 1 where the set of water ports comprise a circumferential band of openings in the housing wherein at least one of the set of openings remain in an open condition regardless of a date selected through rotation of the rotational positionable indicator to the date when the cartridge dispenser is placed into use in the body of recreational water.

6. A cartridge dispenser for alerting a person as to when the cartridge dispenser should be replaced comprising:
a housing having a dispersant chamber therein;
a set of openings therein for the ingress and egress of water;
a dispersant located in the dispersant chamber with the dispersant having a predetermined dispensing life;
a first set of dates located on the housing;
a second set of dates located on the housing; and
a date indicator located on the housing with the date indicator positionable on a first date of the set of dates located on the housing to bring into view a second date when the cartridge dispenser should be replaced where the first date is the date the cartridge dispenser is placed into a body of recreational water.

7. The cartridge dispenser of claim 6 including a first viewing port and a second viewing port in the date indicator.

8. The cartridge dispenser of claim 7 wherein the first set of dates is circumferentially offset from the second set of dates so that the date viewable in a second viewing port is at least a month after the date selected in the first viewing port.

9. The cartridge dispenser of claim 7 wherein the first viewing port and the second viewing port are located along an element of the housing.

10. The cartridge dispenser of claim 7 wherein the first set of dates is a semi circumferential band of dates located on the housing of the dispenser and the second set of dates is a semi circumferential band of dates located on the housing of the dispenser.

11. The cartridge dispenser of claim 7 wherein the set of openings for ingress and egress for water are a fixed size.

12. The cartridge dispenser of claim 7 wherein the date indicator is axially restrained between a first annular band and a second annular band on the housing.

13. The cartridge dispenser of claim 7 wherein the first viewing port and the second viewing port comprise openings in the date indicator.

14. The cartridge dispenser of claim 7 wherein the viewing ports and the set of openings for ingress and egress of water are located along an element of the cartridge dispenser.

15. The cartridge dispenser of claim 6 wherein the date indicator comprises a snap-on sleeve.

16. The cartridge dispenser of claim 6 wherein the first set of dates comprises the months of a calendar year.

17. The cartridge dispenser of claim 16 wherein the second set of dates comprises the months of the calendar year.

18. A method of date marking a cartridge dispenser for replacement when a dispersant in the cartridge dispenser has a predetermined water life comprising;
placing a first circumferential date band on an outer surface of a container where the container has a compartment for the dispersant of predetermined life and a set of ports for water access to the dispersant therein:
placing a second circumferential date band on the outer surface of the container;
placing a rotatable sleeve having a first viewing port and a second viewing port around the container;
rotating the sleeve until the first viewing port exposes a date on the first circumferential band as the date the cartridge dispenser is placed into a body of water and the second viewing port exposed a further date; and
using the date in the second viewing port as the date the cartridge dispenser should be replaced.

19. The method of claim 18 including the steps of placing a first set of calendar months in the first circumferential date band and placing a second set of calendar months in in the second circumferential date band.

20. The method of claim 19 including the step of opening the set of ports on the cartridge dispenser through rotation of the sleeve.

21. The method of claim 18 including the step of opening a water port in the cartridge dispenser.

* * * * *